US 10,989,305 B2

(12) United States Patent
Balsells

(10) Patent No.: US 10,989,305 B2
(45) Date of Patent: Apr. 27, 2021

(54) AXIAL AND RADIAL FLOATING SEALS

(71) Applicant: Bal Seal Engineering, LLC, Foothill Ranch, CA (US)

(72) Inventor: Peter J. Balsells, Newport Beach, CA (US)

(73) Assignee: Bal Seal Engineering, LLC, Foothill Ranch, CA (US)

(*) Notice: Subject to any disclaimer, the term of this patent is extended or adjusted under 35 U.S.C. 154(b) by 0 days.

(21) Appl. No.: 15/799,548

(22) Filed: Oct. 31, 2017

(65) Prior Publication Data

US 2018/0119857 A1    May 3, 2018

Related U.S. Application Data

(60) Provisional application No. 62/415,417, filed on Oct. 31, 2016.

(51) Int. Cl.
*F16L 37/084*    (2006.01)
*F16J 15/3212*    (2016.01)
(Continued)

(52) U.S. Cl.
CPC ....... *F16J 15/3212* (2013.01); *F16J 15/3216* (2013.01); *F16J 15/3248* (2013.01);
(Continued)

(58) Field of Classification Search
CPC .. F16J 15/3212; F16J 15/3248; F16J 15/3252; F16J 15/3236; F16J 15/3268; F16J 15/3244; F16L 37/0842
See application file for complete search history.

(56) References Cited

U.S. PATENT DOCUMENTS 2,950,135 A * 8/1960 Adamson ............. F16J 15/3252
277/565
4,042,248 A * 8/1977 Williamitis .......... F16J 15/3228
277/555
(Continued)

FOREIGN PATENT DOCUMENTS

BE        1014549    * 12/2003
BE        1014549 A3   12/2003
(Continued)

OTHER PUBLICATIONS

Extended European Search Report from European Patent Office on co-pending EP application (EP17199476.7) dated Feb. 27, 2018.
(Continued)

*Primary Examiner* — Nicholas L Foster
*Assistant Examiner* — L. Susmitha Koneru
(74) *Attorney, Agent, or Firm* — Klein, O'Neill & Singh, LLP

(57) ABSTRACT

Floating seal assemblies having a seal element, a support band, and at least two loading springs that produce different spring forces to apply different sealing loads at the first and second sealing flanges of the seal element. The seal assembly is without a locking ring to enable the seal assembly to float along an axis of one of the components to be sealed. The different sealing loads allow the seal assembly to grip against one surface to prevent relative rotation and to enable sealing and relative rotation with another surface.

23 Claims, 5 Drawing Sheets

(51) Int. Cl.

| | |
|---|---|
| *F16J 15/3216* | (2016.01) |
| *F16J 15/3248* | (2016.01) |
| *F16J 15/3268* | (2016.01) |
| *F16J 15/3244* | (2016.01) |
| *F16J 15/3208* | (2016.01) |
| *F16J 15/3252* | (2016.01) |
| *F16F 1/04* | (2006.01) |
| *F16J 15/3236* | (2016.01) |
| *F16J 15/34* | (2006.01) |

(52) U.S. Cl.
CPC ........... *F16J 15/3268* (2013.01); *F16F 1/045* (2013.01); *F16J 15/3208* (2013.01); *F16J 15/3236* (2013.01); *F16J 15/3244* (2013.01); *F16J 15/3252* (2013.01)

(56) References Cited

U.S. PATENT DOCUMENTS

| | | | | | |
|---|---|---|---|---|---|
| 4,278,218 | A | * | 7/1981 | Uhrner | A47L 15/42 277/373 |
| 4,623,153 | A | * | 11/1986 | Nagasawa | F16J 15/322 277/551 |
| 4,655,945 | A | * | 4/1987 | Balsells | C10M 111/00 508/106 |
| 4,804,290 | A | * | 2/1989 | Balsells | F04B 53/143 403/326 |
| 4,805,943 | A | * | 2/1989 | Balsells | F16B 21/078 267/167 |
| 4,822,059 | A | * | 4/1989 | Shimasaki | F16J 15/3232 277/564 |
| 5,072,070 | A | * | 12/1991 | Balsells | F16F 1/045 174/370 |
| 5,079,388 | A | * | 1/1992 | Balsells | F16F 1/045 174/370 |
| 5,091,606 | A | * | 2/1992 | Balsells | F16F 1/04 174/370 |
| 5,117,066 | A | * | 5/1992 | Balsells | F16F 1/04 174/370 |
| 5,134,244 | A | * | 7/1992 | Balsells | F16F 1/045 174/352 |
| 5,161,806 | A | * | 11/1992 | Balsells | F16J 15/027 267/1.5 |
| 5,265,890 | A | * | 11/1993 | Balsells | F16F 3/12 277/467 |
| 5,358,224 | A | * | 10/1994 | Balsells | F16F 1/04 267/167 |
| 5,474,309 | A | * | 12/1995 | Balsells | H05K 9/0016 174/351 |
| 5,575,487 | A | * | 11/1996 | Balsells | F16J 15/062 277/644 |
| 5,599,027 | A | | 2/1997 | Balsells | |
| 5,860,656 | A | * | 1/1999 | Obata | F16J 15/3232 277/549 |
| 5,979,904 | A | * | 11/1999 | Balsells | F16J 15/3236 277/554 |
| 5,984,316 | A | * | 11/1999 | Balsells | F16J 15/3212 277/553 |
| 5,992,856 | A | * | 11/1999 | Balsells | F16J 15/3236 277/553 |
| 6,050,572 | A | * | 4/2000 | Balsells | F16J 15/3216 277/551 |
| 6,161,838 | A | | 12/2000 | Balsells | |
| 6,264,205 | B1 | | 7/2001 | Balsells | |
| 6,543,786 | B2 | * | 4/2003 | Osumi | F16J 15/3228 277/346 |
| 6,641,141 | B2 | * | 11/2003 | Schroeder | F16J 15/166 277/552 |
| 7,210,398 | B2 | * | 5/2007 | Balsells | F16J 1/008 277/437 |
| 7,464,750 | B2 | * | 12/2008 | Schapel | E21B 17/05 166/84.1 |
| 8,096,559 | B2 | * | 1/2012 | Cook | F16J 15/3212 277/353 |
| 8,328,202 | B2 | | 12/2012 | Foster et al. | |
| 8,544,850 | B2 | * | 10/2013 | Balsells | F16J 15/166 277/511 |
| 8,684,362 | B2 | * | 4/2014 | Balsells | F16J 15/3212 277/353 |
| 9,194,497 | B2 | * | 11/2015 | Rastegar | F16J 15/3212 |
| 9,234,591 | B2 | * | 1/2016 | Dilmaghanian | F16J 15/3208 |
| 9,285,034 | B2 | | 3/2016 | Balsells et al. | |
| 9,357,684 | B2 | * | 5/2016 | Foster | F16J 15/061 |
| 9,719,598 | B2 | * | 8/2017 | Thomas | F16J 15/3268 |
| 10,520,092 | B2 | * | 12/2019 | Dilmaghanian | F16J 15/3236 |
| 2006/0022414 | A1 | * | 2/2006 | Balsells | F16J 15/3268 277/572 |
| 2009/0146379 | A1 | * | 6/2009 | Foster | F16J 15/3212 277/307 |
| 2010/0219585 | A1 | * | 9/2010 | Roddis | F16J 15/164 277/347 |
| 2010/0237565 | A1 | * | 9/2010 | Foster | F16J 15/164 277/377 |
| 2011/0006486 | A1 | * | 1/2011 | Niknezhad | F16J 15/3212 277/562 |
| 2011/0204579 | A1 | * | 8/2011 | Donovan | F16J 15/3244 277/559 |
| 2013/0043661 | A1 | * | 2/2013 | Binder | F16J 15/322 277/554 |
| 2014/0312570 | A1 | * | 10/2014 | Foster | F16J 15/06 277/312 |
| 2016/0047473 | A1 | | 2/2016 | Foster et al. | |
| 2016/0223086 | A1 | | 8/2016 | Balsells et al. | |
| 2017/0172018 | A1 | * | 6/2017 | Dilmaghanian | H05K 9/0016 |
| 2017/0261108 | A1 | | 9/2017 | Soler et al. | |
| 2017/0328474 | A1 | | 11/2017 | Balsells | |
| 2018/0112778 | A1 | * | 4/2018 | Dilmaghanian | F16J 15/3212 |

FOREIGN PATENT DOCUMENTS

| | | |
|---|---|---|
| CN | 104595493 A | 5/2015 |
| EP | 2559924 A2 | 2/2013 |
| EP | 3312482 A1 | 4/2018 |
| WO | WO 2011/072192 A2 | 6/2011 |

OTHER PUBLICATIONS

Office Action on co-pending foreign application (EP Application No. 17199476.7) from the European Patent Office dated Aug. 19, 2019.

* cited by examiner

AXIAL AND RADIAL FLOATING SEALS

The present invention generally relates to seal assemblies and more particularly to seal assemblies mounted in a space between two surfaces and can float within that space.

BACKGROUND

Seal assemblies are generally required when a space needs to be isolated from another space, such as an oil box and the environment. Seal assemblies can embody numerous designs and configurations depending on the application. O-rings are well known for sealing between two static surfaces. Spring energized seal assemblies are well known for sealing between a stationary surface and a moving surface, such as a rotating or a reciprocating surface.

When sealing between any two surfaces, the seal assembly can be located against a shoulder to limit possible movement of that seal against the shoulder. The seal assembly can also employ a locking ring so that features of the locking ring can press against one of the two surfaces to be sealed to limit movement of the seal assembly.

SUMMARY

Seal designs in accordance with aspects of the present invention can be used in extreme temperature applications, which can be understood to refer to temperatures at elevated heat or reduced cryogenic levels.

Floating seal assemblies having a seal element, a support band, and at least two loading springs that produce different spring forces to apply different sealing loads at the first and second sealing flanges of the seal element. The seal assembly is without a locking ring to enable the seal assembly to float along an axis of one of the components to be sealed. The different sealing loads allow the seal assembly to grip against one surface to prevent relative rotation and to enable sealing and relative rotation with another surface.

Aspects of the present disclosure include a method of using a floating seal assembly. The method can comprise: placing the seal assembly in a bore of a first structure having a surface defining the bore so that the seal assembly seals against the surface of the bore, wherein the seal assembly comprises: seal element comprising a first sealing flange, a second sealing flange, and a center channel section, which together define a seal cavity; said first sealing flange comprising an outer exterior surface and an outer interior surface, and said second sealing flange comprising an inner interior surface and an inner exterior surface defining an inside bore; a support band comprising a body located within the seal cavity and mechanically engaging the seal element, said body of the support band comprising a groove having a bottom surface, a contoured surface, and a radial lip that reduces an opening to the seal cavity; a first loading spring located in the seal cavity and biasing against the contoured surface and against the inner interior surface of the second sealing flange; a second loading spring located in the groove of the support band and biasing against the bottom surface and against the outer interior surface of the first sealing flange; placing a second structure inside the inside bore of the second sealing flange; and wherein a loading force applied by the first loading spring on the second sealing flange is less than a loading force applied by the second loading spring on the first sealing flange.

The first loading spring can be used for biasing a sealing flange to seal against a second structure. The first loading spring can be a canted coil spring. The second structure can be a shaft.

The second loading spring can be used for biasing a sealing flange to seal against a first structure. The second loading spring can be a canted coil spring, a ribbon spring, or a combination ribbon spring and canted coil spring located inside the ribbon spring. The first structure can be a housing have a bore or cavity for accommodating a seal assembly.

The first structure can be a housing and the second structure can be a shaft.

The method can further comprise the step of providing lubricating fluid at an interface between the second sealing flange the second structure.

The method can further comprise the step of providing a lubricating groove on the inner exterior surface of the first sealing flange.

In an example, the groove can be a spiral groove. The groove at the second sealing flange can comprise two or more separate groove paths. The paths can incrementally decrease in size.

The method can further comprise the step of axially displacing the seal assembly along a centerline of the second structure.

Wherein the contoured surface can comprise a planar section and a slanted section.

Wherein the first loading spring can be a canted coil spring, a ribbon spring, or a V-spring.

Wherein the second loading spring can be a canted coil spring, a ribbon spring, a V-spring, or a combination spring assembly having a canted coil spring located inside a ribbon spring.

A further aspect of the present invention is a seal assembly that can be referred to as a float seal assembly. The seal assembly can comprise: a seal element comprising a first sealing flange, a second sealing flange, and a center channel section, which together define a seal cavity; said first sealing flange comprising an outer exterior surface and an outer interior surface, and said second sealing flange comprising an inner interior surface and an inner exterior surface defining an inside bore; a support band comprising a body located within the seal cavity and mechanically engaging the seal element, said body of the support band) comprising a groove having a bottom surface, a contoured surface, and a radial lip that reduces an opening to the seal cavity; a first loading spring located in the seal cavity and biasing against the contoured surface and against the inner interior surface of the second sealing flange; a second loading spring located in the groove of the support band and biasing against the bottom surface and against the outer interior surface of the first sealing flange; and wherein said first loading spring and said second loading spring produce different spring force values on the second sealing flange and the first sealing flange, respectively, to produce different sealing forces at the second sealing flange and the first sealing flange.

The seal assembly can comprise a groove and wherein the groove can be at least one of a spiral groove, spaced apart vertical grooves, spaced apart horizontal grooves, spaced apart sinusoidal grooves, or spaced apart curved grooves.

The seal assembly can comprise two or more spaced apart lubricating grooves. The two or more spaced apart lubricating grooves can incrementally decrease in size from a first end to a second end of the seal element.

The present application includes a seal assembly located between a first structure having a first surface for the seal assembly to seal against and a second structure having a second surface for the seal assembly to seal against. The seal assembly is structured to isolate fluid from a first environment, such as process fluid or gas, from fluid from a second environment, such as lubricating fluid or the ambient environment. The lubricating fluid can be lubricating oil or lubricating grease.

The seal assembly can be provided without a locking ring. A locking ring is well known in the art for use with a seal element to then engage the first surface or the second surface, depending on whether the seal assembly is a shaft mounted seal assembly or a housing mounted seal assembly. As further discussed below, the seal assembly can be referred to as a floating seal assembly as the absence of the locking ring can allow the seal assembly to float. A typical locking ring can directly engage the housing or the shaft using an interference fit or a spring associated with the locking ring, such as a leaf spring or a loading spring.

In an example, the first structure can be a housing or a gland having a surface or wall defining a bore. The gland can be a seal box of a pump, and the second structure can be a shaft, which can be a solid shaft or a shaft with a hollow bore that can rotate or reciprocate. However, the seal assembly is not limited to such an application and can be used in other applications that require sealing between two surfaces to isolate a first environment from a second environment.

The seal assembly can be located within the bore of the first structure and can comprise a seal element, a support ring or band, a first loading spring, and a second loading spring.

The seal element can comprise an inside flange, an outside flange, and a center channel section, which together define a seal cavity for accommodating a spring, or alternatively referred to as a spring cavity for accommodating a spring.

The seal cavity can be sized and shaped to retain the support ring or band, the first loading spring and the second loading spring. In an example the support ring, the first loading spring, and the second loading spring can all be located within the spring cavity.

In an example, the first loading spring can be a canted coil spring comprising a plurality of interconnected canted coils. The second loading spring can be a ribbon spring comprising a plurality of interconnected ribbon coils.

In some examples, the outside sealing flange may be referred to as a first sealing flange for sealing against the surface defining the bore of the first structure and the inside sealing flange may be referred to as a second sealing flange for sealing against the surface of the second structure. The first loading spring can be used with the second sealing flange for sealing against a second structure and the second loading spring, which can be smaller in size than the first loading spring, can be used with the first sealing flange for sealing against a first structure.

Along the cross-sectional view, the seal element of the present disclosure has a generally U-shape structure, which can be referred to as a U-cup seal with the inside and outside sealing flanges being analogous to the vertical branches of the U-cup and the center channel section being analogous to the middle branch or horizontal section of the U-cup. The seal element may be made from any conventional sealing materials, such as from PTFE and UHMWPE.

The inside sealing flange can have an inner exterior surface defining a sealing lip for sealing against the second structure, such as a shaft, and an inner interior surface for biasing against by the first loading spring. The inside sealing flange, for use to seal against the second structure, can be referred to as a second sealing flange.

The outside sealing flange has an outer exterior surface defining a sealing lip for sealing against the first structure, such as a housing, and an outer interior surface for biasing against by the second loading spring. The outside sealing flange, for use to seal against the first structure, can be referred to as a first sealing flange.

When used in the context of the interior and exterior surfaces of the two sealing flanges, the term exterior is understood to mean exterior to the inside space defined by the two sealing flanges and the term interior is understood to mean interior relative to the exterior of the inside space defined by the two sealing flanges. When used further relative to the centrally located second structure, the terms interior and exterior are relative to the one another and to the second structure.

The outer interior surface of the outside flange can comprise a step located adjacent a projection for mechanical engagement. In other examples, other surface features can be used for mechanical engagement. The step can be configured to engage a projection on the support ring or band in a detent engagement to retain the seal element and the support ring to prevent or restrict separation between the two.

A detent engagement is understood as a mechanical engagement. When mechanically engaged, the vertical side edge of the support ring can contact the center channel section to maintain a positive load at the detent engagement. In an example, the radial dimension of the projection on the support ring or band can apply a compressive force on the outer sealing flange at the step to press the outer sealing flange against the surface of the first structure.

In an example, the outer interior surface at the projection of the outside sealing flange extends to the radial end edge along a single planar surface, without any undulating or recessed section. In an example, a recessed section is incorporated at the outer interior surface of the outer sealing flange adjacent the projection and extends to the radial end edge.

The recessed section at the outside sealing flange may be formed by including a step section or recess in the wall thickness of the outer flange. This recessed section, along with the depth of the groove in the support ring for retaining the second loading spring, can provide added depth for accommodating the second loading spring, as further discussed below.

The dimension between an outer interior surface at the recessed section of the outside sealing flange and the bottom surface of the groove define a receiving gap for receiving the second loading spring. The receiving gap can be adjusted by changing the depth of the bottom surface of the groove and/or the amount of recess of the recessed section to accommodate the particular second loading spring type, as further discussed below.

The inside sealing flange has a base that joins to the center channel section of the seal element. The inside sealing flange can have an end edge at the free end of the inside flange opposite the base. The end edge at the free end of the inside flange can terminate at roughly near the minor axis of the loading spring, which is the shorter of the two axes of the elliptical shaped coil of the loading spring. Termination of the end edge at roughly the minor axis can be selected to coincide with the maximum deflection working range of the first loading spring, which can be at the minor axis.

In an example, the cross-sectional profile of the inside sealing flange is widest at the base and tapers to a smaller girth or width near the end edge. Thus, the inner interior surface of the inside sealing flange can be nonlinear and can be sloped. However, a loading section of the inner interior surface near the end edge can be generally flat or planar, such as being generally parallel to the surface of the second structure to allow the loading spring to bias against a generally flat section. In some examples, a locating groove, such a V-groove, may be incorporated in or at the surface of the inner interior surface, such as within the loading section of the inner interior surface, to locate the first loading spring to the section of the inside sealing flange for biasing against the second structure.

The inner exterior surface that defines the sealing lip can be general flat to form a line contact with the surface of the second structure or can have a taper so as to form a shortened line contact with the surface. The inside diameter of the center channel section, which can be called an inside bore, can be larger than the inside dimeter defined at the sealing lip so that only the sealing lip seals against the surface of the second structure during service.

The support ring or band can have a body, which can be made from a metal material such as stainless steel or from a hard engineered plastic material, such as PEEK. The body can have an outer edge having the projection for engaging the step of the seal element in a detent engagement and a groove for accommodating the second loading spring. In an example, the groove can have two generally parallel sidewalls and a bottom wall or surface located between the two sidewalls. The two sidewalls can have a height that is less than the radial outward surface of the projection. The groove can be understood as having a three-sided structure with the fourth side being an opening for receiving the second loading spring inside the groove.

The bottom wall or surface of the groove and the outer interior surface of the outside sealing flange define a receiving gap for accommodating the second loading spring. As shown, the second loading spring biases against both the bottom surface of the groove and the outer interior surface of the outside sealing flange. The receiving gap can be altered by selecting a different groove depth for the groove and/or the amount of recess of the recessed section of the outside sealing flange, including selecting an outside flange to have no recess, a flat or planar surface, or a radial projection that projects towards the groove.

The receiving gap can vary when using a different second loading spring type or when selecting a different sized loading spring. In an example, the second loading spring can be a ribbon spring, a canted coil spring, a V-spring, also sometimes refers to as a C-spring, or a combination in which the spring assembly has an outer ribbon spring and a canted coil spring located inside the coils of the ribbon spring, as further discussed below.

As shown, the radial outer edge of the body of the support ring is recessed from the inner surface of the first structure, which can be a housing. In a particular example, all parts or components of the support ring is recessed radially of the seal element so that no part of the support ring contacts the surface of the first structure. This configuration can ensure that the support ring does not physically contact or directly engage the first structure, or incorporates a leaf spring or any spring type that otherwise directly contacts the inner surface of the first structure, which is typically utilized by prior art spring energized lip seals to retain the prior art lip seal assembly to the housing to prevent or restrict rotation of the seal assembly during service.

In an embodiment, the second loading spring can bias the outside sealing flange of the seal assembly against the inner surface of the first structure to prevent or restrict the seal assembly from rotating relative to the first structure during service yet still permit the seal assembly to float, such as to move along the direction of the centerline of the second structure.

The body of the support band can have a contoured surface that together with the inner interior surface of the inside sealing flange define the shape of the spring cavity for retaining the first loading spring such that the first loading spring biases against both the inner interior surface and the contoured surface.

In an example, the contoured surface has a planar section and a slanted section. The coils of the loading spring can be positioned within the spring groove to bias against the planar section of the contoured surface and the loading section of the inside sealing flange. The slanted section can be configured to restrict movement of the loading spring within the spring cavity, such as by serving as a physical barrier to prevent or restrict movement of the loading spring towards the center channel section.

A radial lip can be provided with the body of the support ring to retain the first loading spring within the spring cavity. The loading spring can contact the radial lip when mounted inside the spring cavity. The radial lip can be sized and shaped to also control the opening size to the spring cavity. The longer the radial lip, the smaller is the opening to the spring cavity and the harder it is for the first loading spring to separate from the spring cavity. However, a too small of an opening can be difficult when attempting to install the first loading spring within the spring cavity.

In some examples, the radial lip can have a slanted surface on the side closest to the first loading spring, similar to the slanted section of the inner contoured surface. The slanted section and the slanted surface of the radial lip, when incorporated, can confine the first loading spring to retain the first loading spring at a certain turned angle so that the minor axis is not located or aligned directly over the loading section of the inside sealing flange.

The groove of the support band can also incorporate tapered or shaped surfaces so as to retain the second loading spring such that the minor axis of the second loading spring, if a canted coil spring, is not directly perpendicular to the bottom surface of the groove.

In some examples, the first loading spring, the second loading spring, or both loading springs can be a radial canted coil spring or an axial canted coil spring.

In an example, the primary loading spring, the secondary loading spring, or both the primary and the secondary loading springs can be a canted coil spring, a ribbon spring, one of each, or a combination ribbon spring and canted coil spring. One or both loading springs, can also be a V-spring. The two loading springs can be of the same size or different sizes and of the same type or different types.

In an example, the two loading springs are preferably selected such that the loading force applied by the second loading spring on the outside sealing flange to bias the outside sealing flange to seal against the surface of the first structure is greater or higher than the loading force applied by the first loading spring on the inside sealing flange to bias the inside sealing flange to seal against the surface of the second structure, which can be a shaft.

The relative loading forces when using loading springs that can impart different biasing forces can ensure that the outside sealing flange is pressed against the first structure with sufficient biasing force so that the outside sealing flange, and therefore the seal assembly, not rotate relative to the first structure.

Conversely, the loading force by the first loading spring against the inner sealing flange to bias the inner sealing flange to seal against the second structure is preferably selected with sufficient spring force to effect a seal with the second structure, for example a shaft, to isolate fluid at the first environment from fluid at the second environment, but not so great that the grip between the inner exterior surface of the inside flange and the second structure is greater than the friction between the outer exterior surface of the outside sealing flange and the surface of the first structure.

The present seal assembly can allow for the inside sealing flange to seal against a moving surface of the second component, which can rotate or reciprocate, while securing the seal assembly to the surface of the first component using a higher loading force so that the seal assembly does not rotate or reciprocate with the second structure.

When a sufficiently high force is applied along the axial direction of a floating seal of the present disclosure, in a direction parallel to the centerline of the second structure, such as during installation of the seal assembly inside a housing, then the seal assembly can float along the same axial direction. Thus, a seal assembly of the present invention can seal against a first structure and a second structure but wherein the second structure can rotate relative to the inside sealing flange of the seal assembly and the seal assembly can slide relative to an inside surface of a first structure, which can be a housing.

By selecting the relative biasing forces as described, the seal assembly can float within the space between the first structure and the second structure. For example, during installation of the seal assembly within the space between the first structure and the second structure, the seal assembly can slide along the centerline of the second structure to a desired position within the first structure, which can be a housing or a gland, for service.

During operation, movement due to vibration, change in fluid pressure, due to shifting of the working components, etc., the seal assembly can float axially within the space between the first structure and the second structure. There is no locking ring to secure the seal assembly in place within the first structure and there is no shoulder within the first structure or on the second structure to limit the seal assembly from floating in the direction where a shoulder otherwise may be incorporated. Thus, the force created by the second loading spring can be greater than the friction force developed between the inside sealing flange and the second structure, which can be a shaft.

In some examples, the seal assembly of the present disclosure can be modified so that the sealing flange of the seal element that biases against the moving shaft is fixed or not rotatable relative to the shaft and the other sealing flange of the seal element is pressed against a housing but allows for the housing to move relative to the sealing flange. This configuration can be understood as being piston mounted in that the sealing flange that contacts the piston or shaft is not rotatable relative to the piston or shaft.

Canted coil springs and ribbon springs, separately, are well known in the spring industry or field. For example, canted coil springs are disclosed in U.S. Pat. No. 5,139,276, the contents of which are expressly incorporated herein by reference. Each canted coil spring, which can have a length configuration with two free ends or a ring configuration in which the two ends are connected, can comprise a plurality of interconnected coils with each coil pre-canted along the same canting direction and along a selected canting angle. When biased by a force applied tangential to the coil axis, the coils can further cant in the same canting direction. This unique characteristic of canted coil springs cannot be found in standard helical extension springs, which only expand or contract.

Helical ribbon springs are readily searchable using the term "ribbon spring" or "helical ribbon spring" using various internet search engines. In an embodiment of the present invention, a combination ribbon spring and canted coil spring located inside the coils of the ribbon spring can be used as a spring assembly and can have the benefit of providing a large contact area between the individual coils of the ribbon spring and the seal element. At extreme temperature conditions, the relatively larger contact areas of the coils of the ribbon spring, which is tape-like, versus typical round wires of a canted coil spring, can minimize embedding or sinking of the coils into the surface of the seal element.

A V-spring in a ring or garter configuration can be used with the present seal assemblies. The V-spring ring, also sometimes referred to as a C-spring, can be located between a first structure section and a second structure section. The first structure section and the second structure section can represent any of the structures described elsewhere herein that are biased by the same loading spring. The loading spring of the present embodiment, such as the V-spring of the present embodiment, can be used as the first loading spring, the second loading spring, or both the first and the second loading springs.

Thus, as an example, the first structure section can be the support ring, the V-spring can be the first loading spring, and the second structure section can be the inside sealing flange. If the V-spring is the second loading spring, then the first structure section can be the outside sealing flange and the second structure section can be the support ring, and more particularly the bottom wall of the groove of the support ring.

A ribbon can be used as a loading spring of the present invention in a ring or garter configuration. The ribbon spring is shown located between a first structure section and a second structure section. The first structure section and the second structure section can represent any of the structures described elsewhere herein that are biased by the same loading spring. The loading spring of the present embodiment may be used in similar manners as described above or elsewhere.

A spring assembly having coils of a canted coil spring can be located inside ribbon coils of a ribbon spring in a ring or garter configuration of a spring assembly. The combination spring assembly is shown located between a first structure section and a second structure section. The first structure section and the second structure section can represent any of the structures described elsewhere herein that are biased by the same loading spring. The loading spring of the present embodiment, such as the combination spring assembly of the present embodiment, may be used in similar manners as described above or elsewhere.

The combination spring assembly with both a ribbon spring and a canted coil spring can have a generally constant force over a range of deflection of the coils and therefore can provide additional force for the overall combination spring assembly and the spring assembly therefore offers more total spring force than a single spring could provide.

The canted coil spring in the combination spring may provide support to the ribbon spring to prevent deformation of the ribbon spring at higher deflection amounts where a ribbon spring alone, such as the coils of the helical ribbon spring, could permanently deform. The coils of the inner canted coil spring can therefore support the compression or load experienced by the coils of the outer helical ribbon spring.

Additionally, because the width of each coil of the helical ribbon spring of a combination spring is relatively wider or larger than the width of each coil of a typical canted coil spring, the ribbon spring may provide a larger surface of contact for loading onto a surface, such as the surface of a seal element, to energize a seal lip in certain cases where a canted coil spring alone could embed or dig into the seal material or create large gaps between where the coils of the canted coil spring contact the seal element. The combination spring can include a coil of a ribbon spring and a coil of a canted coil spring located within the coil of the ribbon spring. The combination spring assembly can be in a ring configuration with the ends of the ribbon spring and/or the ends of the canted coil spring connected.

In an exemplary seal element embodiment, a plurality of lubricating grooves, or grooves for short, can be provided on the inner exterior surface. In an example, the there are three spaced apart lubricating grooves. The grooves can have the same width and depth or have different widths and depths.

The lubricating grooves can be provided with diminishing sizes with the largest of the groove size being closest to the first end of the seal element and the smallest of the groove size being closest to the second end of the sealing element. Each groove can embody a half-circle cross-section, a half-oval cross-section, a half-square or half-rectangle cross-section, an irregular shaped cross-section, or combinations thereof. The grooves can have identical shapes, but different sizes, or can have different groove shapes and different groove sizes.

The grooves can be provided to lubricate the inner exterior surface of the inside sealing flange as the second structure, such as a shaft, rotates relative to the inside sealing flange.

The second environment near or at the first end of the seal element can be provided with lubricating oil or pressurized grease chamber for lubricating the inside sealing flange with grease. If grease is used, the chamber at the second environment can include a zerk fitting for pressurizing grease into the second environment.

If lubricating oil is used, the oil can travel at the interface of the surface of the second structure and the inner exterior surface of the inside flange to supply oil to the grooves. In some examples, the oil supply can be pressurized and the pressure at the second environment can be kept at a higher pressure than the pressure at the first environment to minimize the potential for migration of dirty fluid or gas from the first environment into the second environment. The higher hydrodynamic pressure can cause clean lubricating oil to leak to the second end of the seal element while preventing contaminated fluid at the first environment from passing to the second environment within the first structure.

The present seal assembly with the grooves as provided on the inside sealing flange, such as to the inner exterior surface of the inside sealing flange, can provide hydrodynamic lubrication at the interface of the surface of the second structure and the inner exterior surface of the inside sealing flange. The grooves can cause lubricating oil to leak to the second of the seal element while preventing contaminated fluid at the first environment from passing to the second environment within the first structure.

In another embodiment, the inner exterior surface that defines the sealing lip of the inside sealing flange can be provided with a lubricating groove that is in the form of a helix or continuous spiral groove provided on the inner exterior surface of the inside sealing flange. In an example, spiral groove can have a constant groove shape, such as width and depth, extending from the end closer to the first end of the seal element to the end closer to the second end of the seal element.

The spiral groove does not terminate to the end edge of the inside flange but recessed from the end edge, so that no fluid communication is provided between the two fluid environments via the spiral groove. As shown, the groove is provided with diminishing sizes with the largest being closest to the first end of the seal element and the smallest being closest to the second end of the sealing element. The groove can embody a half-circle cross-section, a half-oval cross-section, a half-square or half-rectangle cross-section, an irregular shaped cross-section, or combinations thereof. The spiral groove 240 can resemble threads of a nut and can be considered a left-handed thread.

In another example, the spiral 240 can resemble threads of a nut and can be considered a right-handed thread.

In some examples, the inner exterior surface that defines the sealing lip of the inside sealing flange can be provided with two lubricating grooves with each being in the form of a helix or continuous spiral groove provided on the inner exterior surface of the inside sealing flange. For example, one spiral groove can be a left-handed thread and the other spiral groove can be a right-handed thread.

In a further example of a seal element, the inner exterior surface that defines the sealing lip of the inside sealing flange is provided with spaced apart lubricating grooves that are arranged horizontally, generally parallel to the bore defined by the inside sealing flange. In an example, the spaced apart grooves can have a constant groove shape, such as width and depth, extending from the end closer to the first end of the seal element to the end closer to the second end of the seal element, but does not terminate to the end edge of the inside flange. Optionally, each groove also does not originate at the first end of the seal element. By not terminating at the end edge, there is no direct fluid communication between fluids at first and send ends of the seal element when the seal element is in service.

In alternative embodiments, the spaced apart grooves are straight channels but angled as each groove extends inside the bore defined by the inside sealing flange. In still other examples, the spaced apart grooves can be curved or undulating, such as having a sinusoidal shape as each groove extends inside the bore defined by the inside sealing flange. In some examples, the shapes and sizes of the grooves can allow lubricating fluid to flow from the first end of the seal element towards the second end of the seal element and then back to the first end.

Methods of making and of using the seal assemblies and components thereof are within the scope of the present invention.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of seal assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

In the following description, numerous specific details are set forth to provide a more thorough description of the invention. It will be apparent, however, to one skilled in the pertinent art, that the invention may be practiced without these specific details. In other instances, well known features have not been described in detail so as not to obscure the invention. The claims following this description are what define the metes and bounds of the invention.

Figure 1:
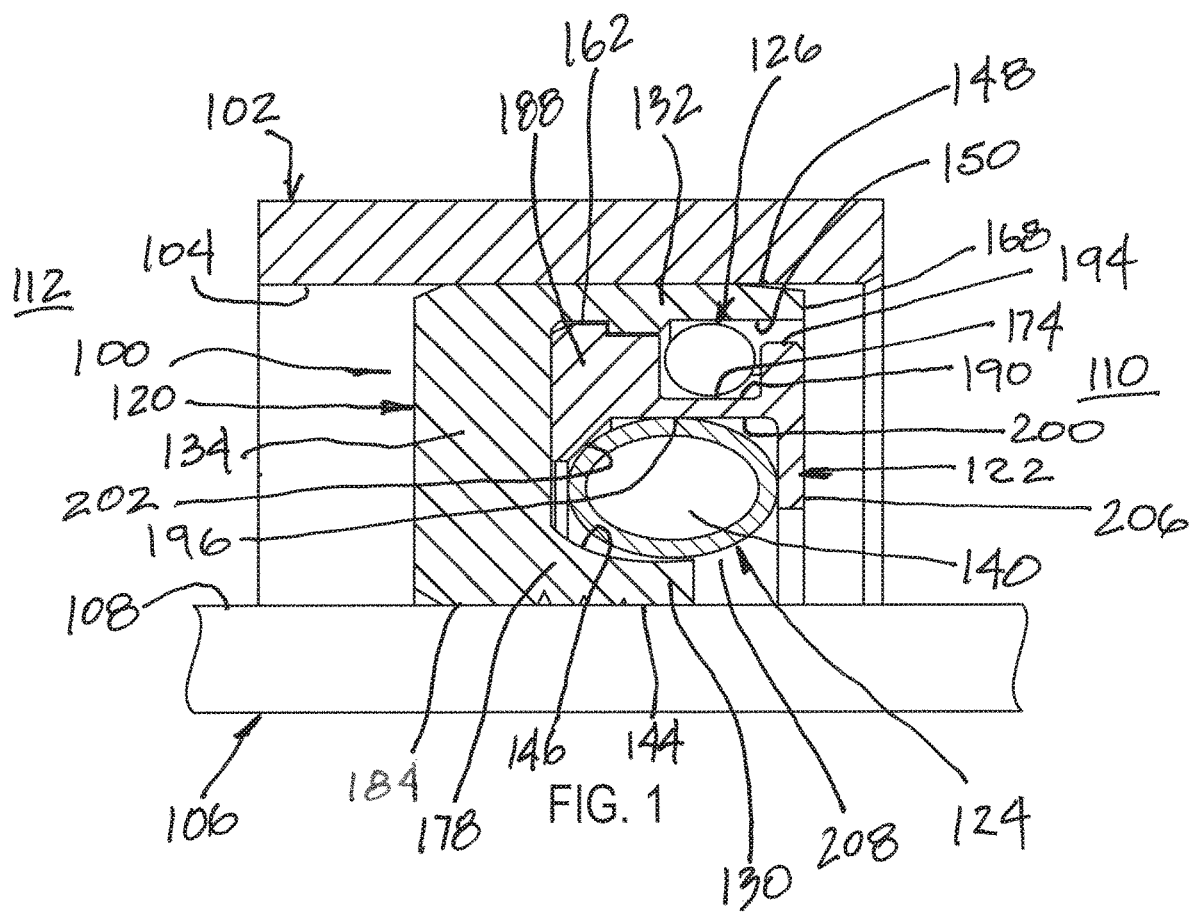
FIG. 1 shows a cross-sectional side view of a section of a seal assembly, such as a floating seal assembly, located inside a bore of a first structure for sealing and sealing against a second structure.

With reference now to FIG. 1, a cross-sectional view about a centerline of a section of a seal assembly 100 located between a first structure 102 having a first surface 104 for the seal assembly to seal against and a second structure 106 having a second surface 108 for the seal assembly to seal against. The seal assembly 100 is structured to isolate fluid from a first environment 110, such as process fluid or gas, from fluid from a second environment 112, such as lubricating supply oil or the ambient environment. The seal assembly 100 is provided without a locking ring that engages the first surface 104 or the second surface 108. As further discussed below, the seal assembly 100 can be referred to as a floating seal assembly as the absence of the locking ring can allow the seal assembly to float.

In an example, the first structure 102 can be a housing or a gland having a surface or wall defining a bore, such as a seal box of a pump, and the second structure 106 can be a shaft, which can be a solid shaft or a shaft with a hollow bore that can rotate or reciprocate. However, the seal assembly 100 is not limited to such application and can be used in other applications that require sealing between two surfaces to isolate a first environment from a second environment.

As shown, the seal assembly 100 can be located within the bore of the first structure 102 and can comprise a seal element 120, a support ring or band 122, a first loading spring 124, and a second loading spring 126. The seal element 120 can comprise an inside flange 130, an outside flange 132, and a center channel section 134, which together define a seal cavity 140 for accommodating a spring, or alternatively referred to as a spring cavity 140 for accommodating a spring. As shown, the seal cavity 140 is sized and shaped to retain the support ring or band 122, the first loading spring 124 and the second loading spring 126. In an example, the first loading spring 124 can be a canted coil spring and the coil shown can be one coil of a plurality of interconnected canted coils. The second loading spring 126 can be a ribbon spring and the coil shown can be one ribbon coil of a plurality of interconnected ribbon coils.

In some examples, the outside sealing flange 132 may be referred to as a first sealing flange for sealing against the surface 104 defining the bore of the first structure 102 and the inside sealing flange 130 may be referred to as a second sealing flange for sealing against the surface 108 of the second structure 106.

Along the cross-sectional view as shown, the seal element 120 has a generally U-shape structure, which can be referred to as a U-cup seal with the inside and outside sealing flanges 130, 132 being analogous to the vertical branches of the U-cup and the center channel section 134 being analogous to the middle branch or horizontal section of the U-cup. The seal element 120 may be made from any conventional sealing materials, such as from PTFE and UHMWPE.

The inside sealing flange 130 has an inner exterior surface 144 defining a sealing lip for sealing against the second structure 106, such as a shaft, and an inner interior surface 146 for biasing against by the first loading spring 124. The outside sealing flange 132 has an outer exterior surface 148 defining a sealing lip for sealing against the first structure 102, such as a housing, and an outer interior surface 150 for biasing against by the second loading spring 126. When used in the context of the interior and exterior surfaces of the two sealing flanges 130, 132, the term exterior is understood to mean exterior to the inside space defined by the two sealing flanges and the term interior is understood to mean interior relative to the exterior of the inside space defined by the two sealing flanges. When used further relative to the centrally located second structure 106, the terms interior and exterior are relative to the one another and to the second structure 106.

Figure 2:
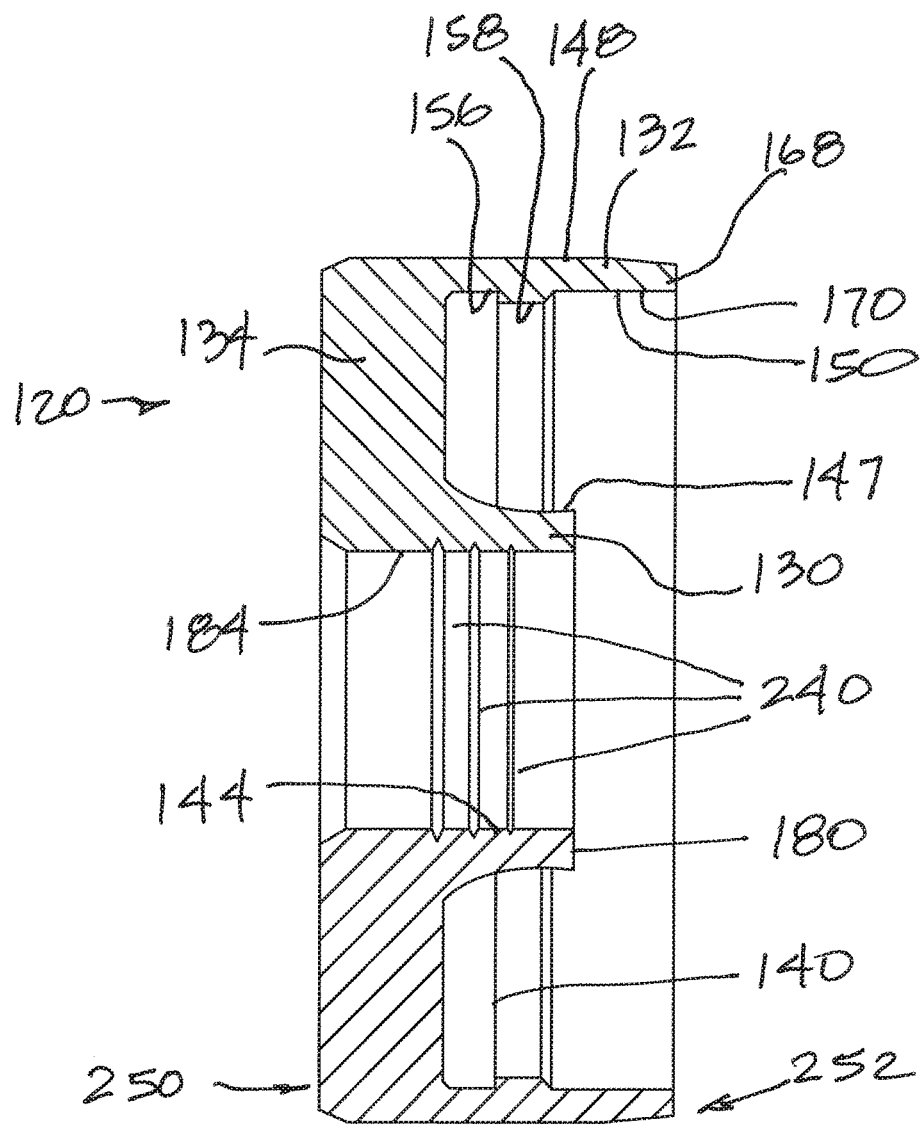
FIG. 2 shows a seal element in accordance with aspects of the present disclosure, which can be a seal element usable in a seal assembly of FIG. 1.

With further reference to FIG. 2 in addition to FIG. 1, the outer interior surface 150 of the outside flange 132 comprises a step 156 located adjacent a projection 158. The step 156 is configured to engage a projection 162 on the support ring or band 122 in a detent engagement to retain the seal element 120 and the support ring 122 to prevent or restrict separation between the two. The detent engagement is understood as a mechanical engagement. When mechanically engaged, the vertical side edge 125 of the support ring 122 preferably contacts the center channel section 134 to maintain a positive load at the detent engagement. In an example, the radial dimension of the projection 162 on the support ring or band 122 applies a compressive force on the outer sealing flange 132 at the step 156 to press the outer sealing flange 132 against the surface 104 of the first structure 102.

In an example, the outer interior surface 150 at the projection 158 extends to the radial end edge 168 along a single planar surface, without any undulating or recessed section. As shown, a recessed section 170 is incorporated at the outer interior surface 150 of the outer sealing flange 132 adjacent the projection 158 and extends to the radial end edge 168.

The recessed section 170 may be formed by including a step section or recess in the wall thickness of the outer flange 132. This recessed section 170, along with the depth of the groove 174 in the support ring 122 for retaining the second loading spring 126, provides added depth for accommodating the second loading spring 126, as further discussed below. The dimension between outer interior surface 150 at the recessed section 170 and the bottom surface of the groove 174 define a receiving gap for receiving the second loading spring 126. The receiving gap can be adjusted by changing the depth of the bottom surface of the groove 174 and/or the amount of recess of the recessed section 170 to accommodate the particular second loading spring type, as further discussed below.

With continued reference to FIGS. 1 and 2, the inside sealing flange 130 has a base 178 that joins to the center channel section 134. The inside sealing flange 130 has an end edge 180 at the free end of the inside flange opposite the base 178. The end edge 180 at the free end of the inside flange 130 terminates at roughly near the minor axis of the loading spring 124, which is the shorter of the two axes of the elliptical shaped coil of the loading spring 124. Termination of the end edge 180 at roughly the minor axis can be selected to coincide with the maximum deflection working range of the first loading spring 124, which is at the minor axis.

In an example, the cross-sectional profile of the inside sealing flange 130 is widest at the base 178 and tapers to a smaller girth or width near the end edge 180. Thus, the inner interior surface 146 of the inside sealing flange 130 is not linear but slopes. However, a loading section 147 of the inner interior surface 146 near the end edge 180 can be generally flat or planar, such as being generally parallel to the surface 108 of the second structure 106 to allow the loading spring 124 to bias against a generally flat section. In some examples, a locating groove, such a V-groove, may be incorporated in or at the surface of the inner interior surface 146, such as within the loading section 147 of the inner interior surface 146, to locate the first loading spring 124 to the section of the inside sealing flange for biasing against the second structure 106.

The inner exterior surface 144 that defines the sealing lip can be general flat to form a line contact with the surface 108 of the second structure 106 or can have a taper so as to form a shortened line contact with the surface 108. The inside diameter 184 of the center channel section 134, which can be called an inside bore 184, can be larger than the inside dimeter defined at the sealing lip 144 so that only the sealing lip seals against the surface 108 of the second structure 106 during service.

With continued reference to FIG. 1, the support ring or band 122 has a body 188, which can be made from a metal material such as stainless steel or from a hard engineered plastic material, such as PEEK. The body 188 has an outer edge having the projection 162 for engaging the step 156 of the seal element in a detent engagement and a groove 174 for accommodating the second loading spring. In an example, the groove 174 has two generally parallel sidewalls and a bottom wall or surface 190 located between the two sidewalls. The two sidewalls has a height that is less than the radial outward surface of the projection 162. The groove 174 is understood as having a three-sided structure with the fourth side being an opening for receiving the second loading spring 126 inside the groove 174.

The bottom wall or surface 190 of the groove 174 and the outer interior surface 150 of the outside sealing flange 132 define a receiving gap for accommodating the second loading spring 126. As shown, the second loading spring 126 biases against both the bottom surface 190 of the groove 174 and the outer interior surface 150 of the outside sealing flange 132. The receiving gap can be altered by selecting a different groove depth for the groove 174 and/or the amount of recess of the recessed section 170 of the outside sealing flange 126, including selecting an outside flange to have no recess, a flat or planar surface, or a radial projection that projects towards the groove 174. The receiving gap can vary when using a different second loading spring type or when selecting a different sized loading spring. In an example, the second loading spring 126 can be a ribbon spring, a canted coil spring, a V-spring, also sometimes refers to as a C-spring, or a combination in which the spring assembly has an outer ribbon spring and a canted coil spring located inside the coils of the ribbon spring, as further discussed below.

As shown, the radial outer edge 194 of the body 188 of the support ring 122 is recessed from the inner surface 104 of the first structure 102, which can be a housing. In a particular example, all parts or components of the support ring 122 is recessed radially of the seal element 120 so that no part of the support ring 122 contacts the surface 104 of the first structure 102. This configuration ensures that the support ring 122 does not physically contact or directly engage the first structure, or incorporates a leaf spring or any spring type that otherwise directly contacts the inner surface 104 of the first structure 102, which is typically utilized by prior art spring energized lip seals to retain the prior art lip seal assembly to the housing to prevent or restrict rotation of the seal assembly during service. In the present embodiment, the second loading spring 126 biases the outside sealing flange 132 of the seal assembly 100 against the inner surface 104 of the first structure 102 to prevent or restrict the seal assembly from rotating relative to the first structure during service yet still permit the seal assembly 100 to float, such as to move along the direction of the centerline of the second structure 106.

The body 188 of the support band 122 has a contoured surface 196 that together with the inner interior surface 146 of the inside sealing flange 130 define the shape of the spring cavity 140 for retaining the first loading spring 124 such that the first loading spring 124 biases against both the inner interior surface 146 and the contoured surface 196. In an example, the contoured surface 196 has a planar section 200 and a slanted section 202. The coils of the loading spring 124 are positioned within the spring groove 140 to bias against the planar section 200 of the contoured surface 196 and the loading section 147 of the inside sealing flange 130. The slanted section 202 is configured to restrict movement of the loading spring within the spring cavity 140, such as by serving as a physical barrier to prevent or restrict movement of the loading spring towards the center channel section 134.

A radial lip 206 can be provided with the body 188 of the support ring to retain the first loading spring 124 within the spring cavity 140. The loading spring can contact the radial lip 206 when mounted inside the spring cavity 140. The radial lip 206 can be sized and shaped to also control the opening 208 size to the spring cavity. The longer the radial lip 206, the smaller is the opening 208 to the spring cavity and the harder it is for the first loading spring to separate from the spring cavity 140. However, a too small of an opening 208 can be difficult when attempting to install the first loading spring within the spring cavity.

In some examples, the radial lip 206 can have a slanted surface on the side closest to the first loading spring 124, similar to the slanted section 202 of the inner contoured surface 196. The slanted section 202 and the slanted surface of the radial lip 206, when incorporated, can confine the first loading spring 124 to retain the first loading spring at a certain turned angle so that the minor axis is not directly over the loading section 147 of the inside sealing flange 130. The groove 174 of the support band 122 can also incorporate tapered or shaped surfaces so as to retain the second loading spring 126 such that the minor axis of the second loading spring, if a canted coil spring, is not directly perpendicular to the bottom surface of the groove.

In some examples, the first loading spring, the second loading spring, or both loading springs can be a radial canted coil spring or an axial canted coil spring.

In an example, the primary loading spring 124, the secondary loading spring 126, or both the primary and the secondary loading springs can be a canted coil spring, a ribbon spring, one of each, or a combination ribbon spring and canted coil spring. One or both loading springs 124, 126 can also be a V-spring. The two springs can be of the same size or different sizes and of the same type or different types. However, the two loading springs are preferably selected such that the loading force applied by the second loading spring 126 on the outside sealing flange 132 to bias the outside sealing flange 132 to seal against the surface 104 of the first structure 102 is greater or higher than the loading force applied by the first loading spring 124 on the inside sealing flange 130 to bias the inside sealing flange to seal against the surface 108 of the second structure 106, which can be a shaft. The relative loading forces ensure that the outside sealing flange 132 is pressed against the first structure 102 with sufficient biasing force so that the outside sealing flange, and therefore the seal assembly 100, not rotate relative to the first structure 102.

Conversely, the loading force by the first loading spring 124 against the inner sealing flange 130 to bias the inner sealing flange 130 to seal against the second structure 106 is preferably selected with sufficient spring force to effect a seal with the second structure 106, for example a shaft, to isolate fluid at the first environment 110 from fluid at the second environment 112 (FIG. 1), but not so great that the grip between the inner exterior surface 144 of the inside flange 130 and the second structure 106 is greater than the friction between the outer exterior surface 148 of the outside sealing flange 132 and the surface 104 of the first structure 102.

Thus, the present seal assembly 100 allows for the inside sealing flange 130 to seal against a moving surface 108 of the second component 106, which can rotate or reciprocate, while securing the seal assembly 100 to the surface 104 of the first component 102 using a higher loading force so that the seal assembly does not rotate or reciprocate with the second structure 106. However, when a sufficiently high force is applied along the axial direction, parallel to the centerline of the second structure 106, such as during installation of the seal assembly inside a housing, then the seal assembly 100 can float along the same axial direction.

By selecting the relative biasing forces as described, the seal assembly 100 can float within the space between the first structure 102 and the second structure 106. For example, during installation of the seal assembly within the space between the first structure 102 and the second structure 106, the seal assembly can slide along the centerline of the second structure 106 to a desired position within the first structure 102, which can be a housing or a gland, for service. Similarly, during operation, movement due to vibration, change in fluid pressure, due to shifting of the working components, etc., the seal assembly 100 can float axially within the space between the first structure 102 and the second structure 106. There is no locking ring to secure the seal assembly 100 in place within the first structure 102 and there is no shoulder within the first structure or on the second structure 106 to limit the seal assembly 100 from floating in the direction where a shoulder otherwise may be incorporated. Thus, the force created by the second loading spring 126 is greater than the friction force developed between the inside sealing flange 130 and the second structure 106, which can be a shaft.

In some examples, the seal assembly is modified so that the sealing flange that biases against the moving shaft is fixed or not rotatable relative to the shaft and the other sealing flange of the seal element is pressed against a housing but allows for the housing to move relative to the corresponding sealing flange. This configuration can be understood as being piston mounted in that the sealing flange that contacts the piston or shaft is not rotatable relative to the piston.

Canted coil springs and ribbon springs, separately, are well known in the spring industry or field. For example, canted coil springs are disclosed in U.S. Pat. No. 5,139,276, the contents of which are expressly incorporated herein by reference. Each canted coil spring, which can have a length configuration with two free ends or a ring configuration in which the two ends are connected, comprises a plurality of interconnected coils with each coil pre-canted along the same canting direction and along a selected canting angle. When biased by a force applied tangential to the coil axis, the coils will further cant in the same canting direction. This unique characteristic of canted coil springs cannot be found in standard helical extension springs, which only expand or contract.

Helical ribbon springs are readily searchable using the term "ribbon spring" or "helical ribbon spring" using various internet search engines. In the present embodiment, a combination ribbon spring and canted coil spring located inside the coils of the ribbon spring can be used as a spring assembly and can have the benefit of providing a large contact area between the individual coils of the ribbon spring and the seal element. At extreme temperature conditions, the relatively larger contact areas of the coils of the ribbon spring, which is tape-like, versus typical round wires of a canted coil spring, can minimize embedding or sinking of the coils into the surface of the seal element.

Figure 6:
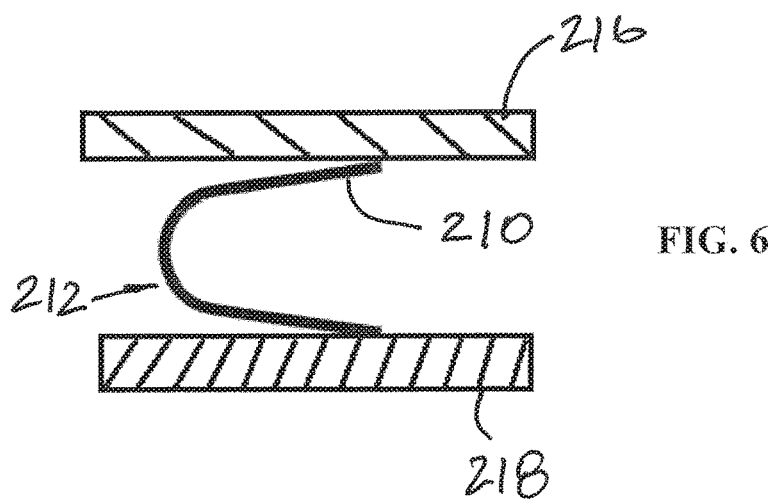
FIG. 6 shows a schematic cross-sectional side view of a V-spring or C-spring located between a first structure section and a second structure section.

With reference now to FIG. 6, a schematic cross-sectional side view of a single V-spring element 210 of a loading spring is shown, which in the present embodiment is shown as a V-spring 212 in a ring or garter configuration. The V-spring ring 212, also sometimes referred to as a C-spring, is shown located between a first structure section 216 and a second structure section 218. The first structure section 216 and the second structure section 218 can represent any of the structures described elsewhere herein that are biased by the same loading spring. The loading spring 212 of the present embodiment, such as the V-spring of the present embodiment, can be used as the first loading spring 124, the second loading spring 126, or both the first and the second loading springs.

Thus, as an example, the first structure section 216 can be the support ring 122 of FIG. 1, the V-spring 212 can be the first loading spring 124 of FIG. 1, and the second structure section 218 can be the inside sealing flange 130 of FIG. 1. If the V-spring 212 is the second loading spring 126 of FIG. 1, then the first structure section 216 can be the outside sealing flange 132 of FIG. 1 and the second structure section 218 can be the support ring 122 of FIG. 1, and more particularly the bottom wall 190 of the groove 174 of FIG. 1.

Figure 7:
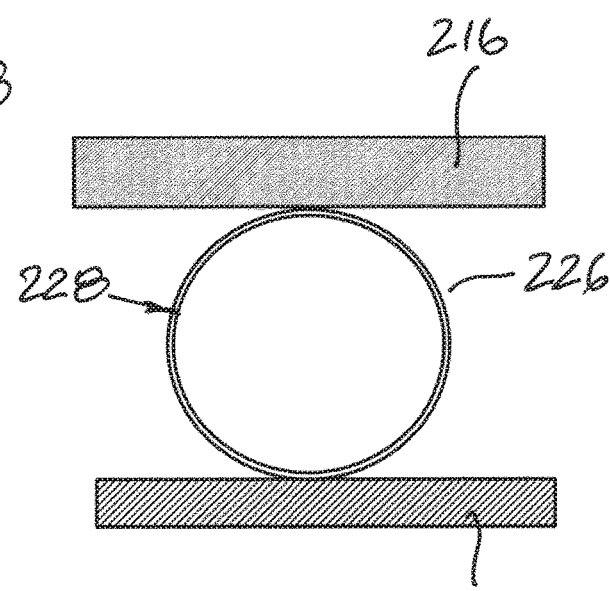
FIG. 7 shows a schematic cross-sectional side view of a ribbon spring located between a first structure section and a second structure section.

With reference now to FIG. 7, a schematic cross-sectional side view of a single ribbon coil 226 of a loading spring is shown, which in the present embodiment is shown as a ribbon spring 228 in a ring or garter configuration. The ribbon spring 228 is shown located between a first structure section 216 and a second structure section 218. The first structure section 216 and the second structure section 218 can represent any of the structures described elsewhere herein that are biased by the same loading spring. The loading spring of the present embodiment may be used in similar manners as described above for the loading spring of FIG. 6.

Figure 8:
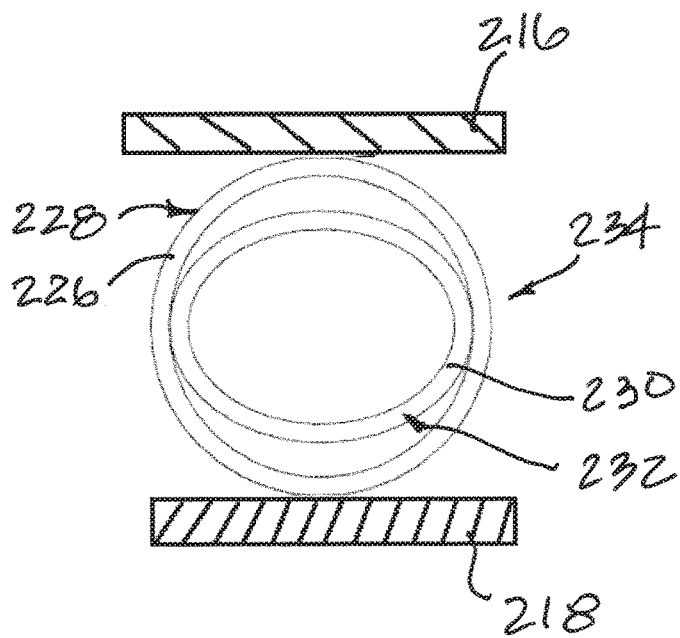
FIG. 8 shows a schematic cross-sectional side view of a combination spring assembly located between a first structure section and a second structure section.

With reference now to FIG. 8, a schematic cross-sectional side view of a single ribbon coil 226 having a single elliptical canted coil 230 of a loading spring is shown, which in the present embodiment is shown as a spring assembly 234, or a combination spring assembly, having coils 230 (only one shown) of a canted coil spring 232 located inside ribbon coils 226 (only one shown) of a ribbon spring 228 in a ring or garter configuration. The combination spring assembly 234 is shown located between a first structure section 216 and a second structure section 218. The first structure section 216 and the second structure section 218 can represent any of the structures described elsewhere herein that are biased by the same loading spring. The loading spring of the present embodiment, such as the combination spring assembly 234 of the present embodiment, may be used in similar manners as described above for the loading spring of FIG. 6.

The canted coil spring 232 located inside the ribbon spring 228 in the combination spring assembly 234 (FIG. 8) can have a generally constant force over a range of deflection of the coils and therefore can provide additional force for the overall combination spring assembly and the spring assembly therefore offers more total spring force than a single spring could provide. The canted coil spring may also provide support to the ribbon spring to prevent deformation of the ribbon spring at higher deflection amounts where a ribbon spring alone, such as the coils of the helical ribbon spring, could permanently deform. The coils of the inner canted coil spring can therefore support the compression or load experienced by the coils of the outer helical ribbon spring. Additionally, because the width of each coil of the helical ribbon spring is relatively wider or larger than the width of each coil of a typical canted coil spring, the ribbon spring may provide a larger surface of contact for loading onto a surface, such as the surface of a seal element, to energize a seal lip in certain cases where a canted coil spring alone could embed or dig into the seal material or create large gaps between where the coils of the canted coil spring contact the seal element. The combination spring assembly 234 is shown schematically in FIG. 8, which shows a coil 226 of a ribbon spring 228 and a coil 230 of a canted coil spring 232 located within the coil of the ribbon spring. The combination spring assembly 234 can be in a ring configuration with the ends of the ribbon spring and/or the ends of the canted coil spring connected.

With reference again to FIG. 2, a cross-sectional view of the seal element 120 of FIG. 1 is shown without the two loading springs 124, 126 and without the support ring 122. The inside sealing flange 130, the outside sealing flange 132, and the center channel section 134 defining the spring cavity 140 can clearly be seen in FIG. 2. In the present view, the inner exterior surface 144 that defines the sealing lip of the inside sealing flange 130 can also be seen.

In the present embodiment, a plurality of lubricating grooves 240, or grooves for short, are provided on the inner exterior surface 144. In an example, the there are three spaced apart lubricating grooves 240. The grooves can have the same width and depth or have different widths and depths. As shown, the grooves 240 are provided with diminishing sizes with the largest being closest to the first end 250 of the seal element 120 and the smallest being closest to the second end 252 of the sealing element 120. Each groove can embody a half-circle cross-section, a half-oval cross-section, a half-square or half-rectangle cross-section, an irregular shaped cross-section, or combinations thereof. The grooves can have identical shapes, but different sizes, or can have different groove shapes and different groove sizes.

The grooves 240 can be provided to lubricate the inner exterior surface 144 of the inside sealing flange 130 as the second structure 106, such as a shaft, rotates relative to the inside sealing flange. With continued reference to FIG. 2 and with further reference to FIG. 1, the second environment 112 near or at the first end 250 of the seal element can be provided with lubricating oil or pressurized grease chamber for lubricating the inside sealing flange with grease. If grease is used, the chamber at the second environment 112 can include a zerk fitting for pressurizing grease into the second environment.

If lubricating oil is used, the oil can travel at the interface of the surface 108 of the second structure 106 and the inner exterior surface 144 of the inside flange to supply oil to the grooves 240. In some examples, the oil supply can be pressurized and the pressure at the second environment 112 can be kept at a higher pressure than the pressure at the first environment 110 to minimize the potential for migration of dirty fluid or gas from the first environment 110 into the second environment 112. The higher hydrodynamic pressure can cause clean lubricating oil to leak to the second end 252 of the seal element while preventing contaminated fluid at the first environment 110 from passing to the second environment 112 within the first structure 102.

Thus, the present seal assembly, with the grooves 240 as provided on the inside sealing flange 130, such as to the inner exterior surface 144 of the inside sealing flange, can provide hydrodynamic lubrication at the interface of the surface 108 of the second structure 106 and the inner exterior surface 144 of the inside sealing flange. The grooves 240 can cause clean lubricating oil to leak to the second end 252 of the seal element 120 while preventing contaminated fluid at the first environment 110 from passing to the second environment 112 within the first structure 102.

Figure 3:
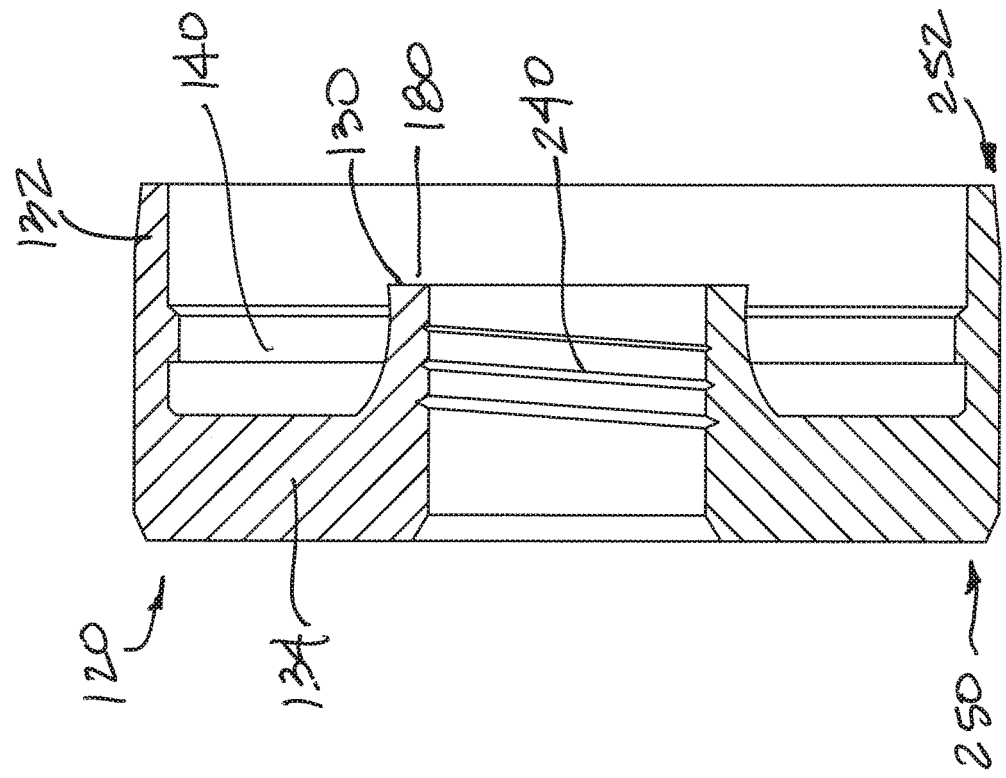

With reference now to FIG. 3, a cross-sectional view of an alternative seal element 120 provided in accordance with aspects of the present invention is shown. The present seal element 120 is similar to the seal element of FIGS. 1 and 2 with a few exceptions. Thus, the present seal element 120 is usable with other seal assembly components described elsewhere herein, such as with reference to FIGS. 1, 2 and 6-8.

In the present seal element embodiment, the inner exterior surface 144 that defines the sealing lip of the inside sealing flange 130 is provided with a lubricating groove 240 that is in the form of a helix or continuous spiral groove provided on the inner exterior surface 144 of the inside sealing flange 130. In an example, spiral groove 240 has a constant groove shape, such as width and depth, extending from the end closer to the first end 250 of the seal element to the end closer to the second end 252 of the seal element 120. However, the spiral groove 240 does not terminate to the end edge 180 of the inside flange but recessed from the end edge, so that no fluid communication is provided between the two fluid environments 110, 112 via the spiral groove 240. As shown, the groove 240 is provided with diminishing sizes with the largest being closest to the first end 250 of the seal element 120 and the smallest being closest to the second end 252 of the sealing element 120. The groove 240 can embody a half-circle cross-section, a half-oval cross-section, a half-square or half-rectangle cross-section, an irregular shaped cross-section, or combinations thereof. The spiral groove 240 can resemble threads of a nut and can be considered a left-handed thread.

Figure 4:
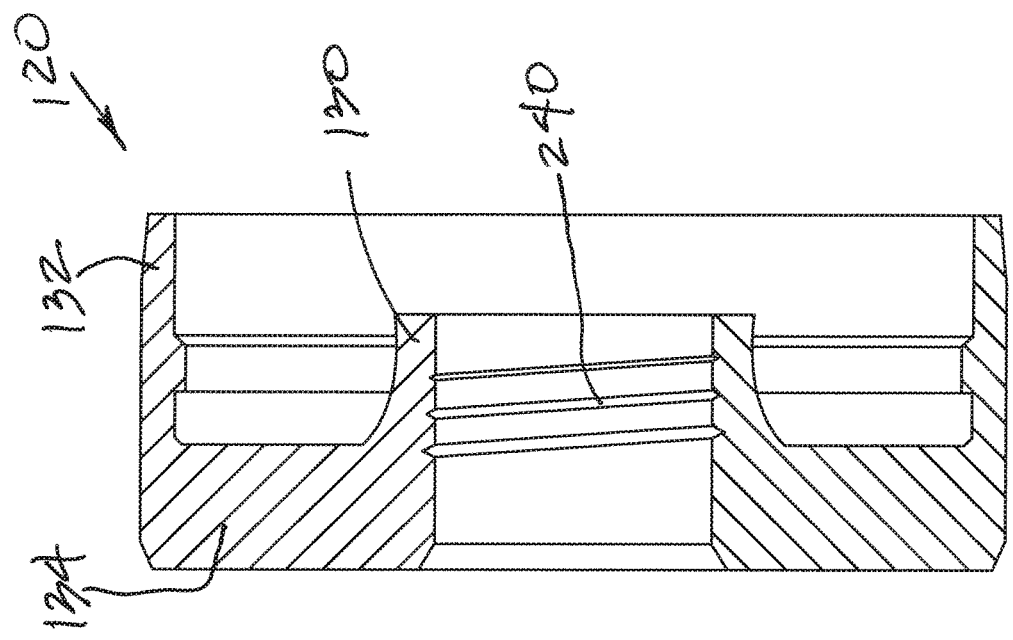
FIGS. 3-5 show alternative seal elements in accordance with aspects of the present disclosure, which can be a seal element usable in a seal assembly of FIG. 1.

With reference now to FIG. 4, a cross-sectional view of an alternative seal element 120 provided in accordance with aspects of the present invention is shown. The present seal element 120 is similar to the seal element of FIG. 3 with a few exceptions. In the present seal element embodiment, the inner exterior surface 144 that defines the sealing lip of the inside sealing flange 130 is provided with a lubricating groove 240 that is in the form of a helix or continuous spiral groove provided on the inner exterior surface 144 of the inside sealing flange 130. The spiral groove 240 can resemble threads of a nut and can be considered a right-handed thread.

In some examples, the inner exterior surface 144 that defines the sealing lip of the inside sealing flange 130 is provided with two lubricating grooves 240 with each being in the form of a helix or continuous spiral groove provided on the inner exterior surface 144 of the inside sealing flange 130. For example, one spiral groove can be a left-handed thread and the other spiral groove can be a right-handed thread.

Figure 5:
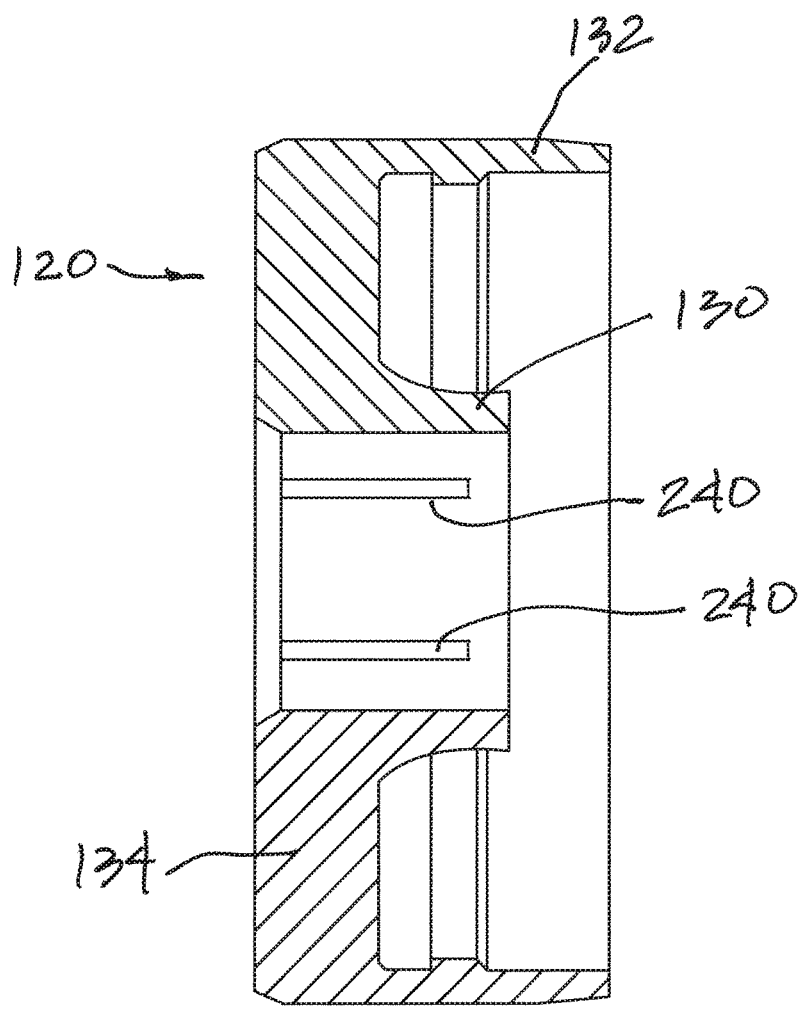

With reference now to FIG. 5, a cross-sectional view of an alternative seal element 120 provided in accordance with aspects of the present invention is shown. The present seal element 120 is similar to the seal element of FIGS. 1-4 with a few exceptions. Thus, the present seal element 120 is usable with other seal assembly components described elsewhere herein, such as with reference to FIGS. 1, 2 and 6-8.

In the present seal element embodiment, the inner exterior surface 144 that defines the sealing lip of the inside sealing flange 130 is provided with spaced apart lubricating grooves 240 that are arranged horizontally, generally parallel to the bore defined by the inside sealing flange 130. In an example, the spaced apart grooves 240 has a constant groove shape, such as width and depth, extending from the end closer to the first end 250 of the seal element to the end closer to the second end 252 of the seal element 120, but does not terminate to the end edge 180 of the inside flange 130. Optionally, each groove 240 also does not originate at the first end 250 of the seal element. By not terminating at the end edge 180, there is no direct fluid communication between fluids at first and send ends 250, 252 of the seal element when the seal element is in service.

In alternative embodiments, the spaced apart grooves 240 are straight channels as shown but angled as each groove extends inside the bore defined by the inside sealing flange. In still other examples, the spaced apart grooves are curved or undulating, such as having a sinusoidal shape as each groove extends inside the bore defined by the inside sealing flange. In some examples, the shapes and sizes of the grooves can allow lubricating fluid to flow from the first end 250 of the seal element towards the second end 252 of the seal element and then back to the first end 250.

Methods of making and of using the seal assemblies and components thereof are within the scope of the present invention.

Although limited embodiments of the seal assemblies and their components have been specifically described and illustrated herein, many modifications and variations will be apparent to those skilled in the art. For example, the various seal assemblies may be made from different but compatible materials as disclosed, different combination of loading springs may be used, different applications for the same disclosed seal assemblies, etc. Furthermore, it is understood and contemplated that features specifically discussed for one seal embodiment may be adopted for inclusion with another seal embodiment, provided the functions are compatible. Accordingly, it is to be understood that the seal assemblies and their components constructed according to principles of the disclosed devices, systems, and methods may be embodied other than as specifically described herein. The disclosure is also defined in the following claims.

What is claimed is:

1. A method of using a floating seal assembly comprising:
placing the seal assembly in a bore of a first structure having a surface defining the bore so that the seal assembly seals against the surface of the bore, wherein the seal assembly comprises:
a seal element comprising a first sealing flange, a second sealing flange, and a center channel section, which together define a seal cavity; said first sealing flange comprising an outer exterior surface and an outer interior surface, and said second sealing flange comprising an inner interior surface and an inner exterior surface defining an inside bore;
a support band comprising a body located within the seal cavity and mechanically engaging the seal element so that axial movement of the body relative to the seal element is blocked but radial movement of the body relative to the seal element is not blocked, said body of the support band comprising a groove, a contoured surface, and a radial lip, wherein the groove comprises a bottom surface and the radial lip extends radially away from the bottom surface of the groove to reduce an opening to the seal cavity;
a first loading spring located in the seal cavity and biasing against the contoured surface and against the inner interior surface of the second sealing flange;
a second loading spring located in the groove of the support band and biasing against the bottom surface and against the outer interior surface of the first sealing flange;
placing a second structure inside the inside bore of the second sealing flange; and
wherein a loading force applied by the first loading spring on the second sealing flange is less than a loading force applied by the second loading spring on the first sealing flange.

2. The method of claim 1, wherein the first structure is a housing and the second structure is a shaft.

3. The method of claim 2, further comprising the step of providing lubricating fluid at an interface between the second sealing flange the second structure.

4. The method of claim 2, further comprising providing a lubricating groove on the inner exterior surface of the first sealing flange.

5. The method of claim 2, further comprising the step of axially displacing the seal assembly along a centerline of the second structure.

6. The method of claim 1, wherein the contoured surface comprises a planar section and a slanted section.

7. The method claim 1, wherein the first loading spring is a canted coil spring, a ribbon spring, or a V-spring.

8. The method claim 7, wherein the second loading spring is a canted coil spring, a ribbon spring, a V-spring, or a combination spring assembly having a canted coil spring located inside a ribbon spring.

9. A seal assembly comprising:
a seal element comprising a first sealing flange, a second sealing flange, and a center channel section, which together define a seal cavity; said first sealing flange comprising an outer exterior surface and an outer interior surface, and said second sealing flange comprising an inner interior surface and an inner exterior surface defining an inside bore defining a lengthwise axis;

a support band comprising a body located within the seal cavity and having a detent mechanically engaging the first sealing flange of the seal element in a detent engagement and spaced from the second sealing flange, said body of the support band comprising a first groove having a bottom surface and a second groove defined by a contoured surface and a radial lip, and wherein the radial lip extends radially away from a planar section of the contoured surface to reduce an opening to the seal cavity and the contoured surface comprises a slanted section having a shape that differs from the radial lip;

a first loading spring located in the seal cavity, in the second groove, and biasing against the slanted surface of the contoured surface, against the radial lip at a location spaced from the contoured surface, and against the inner interior surface of the second sealing flange; and a second loading spring located in the first groove of the support band and biasing against the bottom surface and against the outer interior surface of the first sealing flange, and wherein the sealing flange extends axially along the lengthwise axis around the support band, including around the radial lip;

wherein said first loading spring and said second loading spring have different spring force values on the second sealing flange and the first sealing flange, respectively, to produce different sealing forces at the second sealing flange and the first sealing flange; and wherein one of the first loading spring and the second loading spring urges the body of the support band into mechanically engaging the seal element in the detent arrangement.

10. The seal assembly of claim 9, located in a housing and having a shaft projecting through the inside bore.

11. The seal assembly of claim 9, further comprising a lubricating groove on the inner exterior surface of the first sealing flange.

12. The seal assembly claim 9, wherein the seal element comprises a step that engages the detent on the support band to mechanically engage the support band to the seal element.

13. The seal assembly of claim 9, wherein the contoured surface comprises a planar section and the slanted section.

14. The seal assembly claim 9, wherein the first loading spring is a canted coil spring, a ribbon spring, or a V-spring and the second loading spring is a canted coil spring, a ribbon spring, a V-spring, or a combination spring assembly having a canted coil spring located inside a ribbon spring.

15. The seal assembly of claim 11, wherein the lubricating groove is at least one of a spiral groove, spaced apart vertical grooves, spaced apart horizontal grooves, spaced apart sinusoidal grooves, or spaced apart curved grooves.

16. A floating seal assembly comprising:

a seal element comprising a first sealing flange, a second sealing flange, and a center channel section, which together define a seal cavity; said first sealing flange comprising an outer exterior surface and an outer interior surface, and said second sealing flange comprising an inner interior surface and an inner exterior surface defining an inside bore;

two or more spaced apart lubricating grooves or a helix groove located inside the inside bore and terminating short of an end edge of the second sealing flange, said end edge of the second sealing flange located opposite the center channel section, a cross-sectional area of the spaced apart lubricating grooves or the helix groove decreasing moving toward the end edge;

a support band comprising a body located within the seal cavity and mechanically engaging the first sealing flange of the seal element and spaced from the second sealing flange, said body of the support band comprising a first groove and a second groove defined by a contoured surface and a radial lip;

a first loading spring located in the second groove and biasing against the contoured surface, against the radial lip, and against the inner interior surface of the second sealing flange;

a second loading spring located in the first groove of the support band and biasing against a bottom surface of the first groove and against the outer interior surface of the first sealing flange; and wherein the second groove and the first groove have different groove geometries.

17. The floating seal assembly of claim 16, wherein said first loading spring and said second loading spring have different spring force values on the second sealing flange and the first sealing flange, respectively, to produce different sealing forces at the second sealing flange and the first sealing flange.

18. The floating seal assembly of claim 17, wherein the first loading spring is at least one of canted coil spring, a ribbon spring, or a V-spring and the second loading spring is at least one of a canted coil spring, a ribbon spring, a V-spring, or a combination spring assembly having a canted coil spring located inside a ribbon spring.

19. The floating seal assembly of claim 16, wherein the mechanical engagement is a detent engagement.

20. The floating seal assembly of claim 19, wherein the radial lip extends radially away from the bottom surface of the groove to reduce an opening to the seal cavity.

21. The floating seal assembly of claim 16, wherein the radial lip extends radially away from a planar section of the contoured surface.

22. The floating seal assembly of claim 16, wherein contoured surface has a radial height oriented orthogonally to a lengthwise axis of the inside bore, and wherein the radial lip has a radial height that is greater than the radial height of the contoured surface.

23. The floating seal assembly of claim 16, wherein the contoured surface has a slanted section and a planar section and wherein both the slanted section and the planar section contact the first loading spring.

* * * * *